(No Model.)
L. J. WOHNLICH.
SPEED INDICATOR FOR SHAFTING.
No. 252,285.　　　　　Patented Jan. 10, 1882.
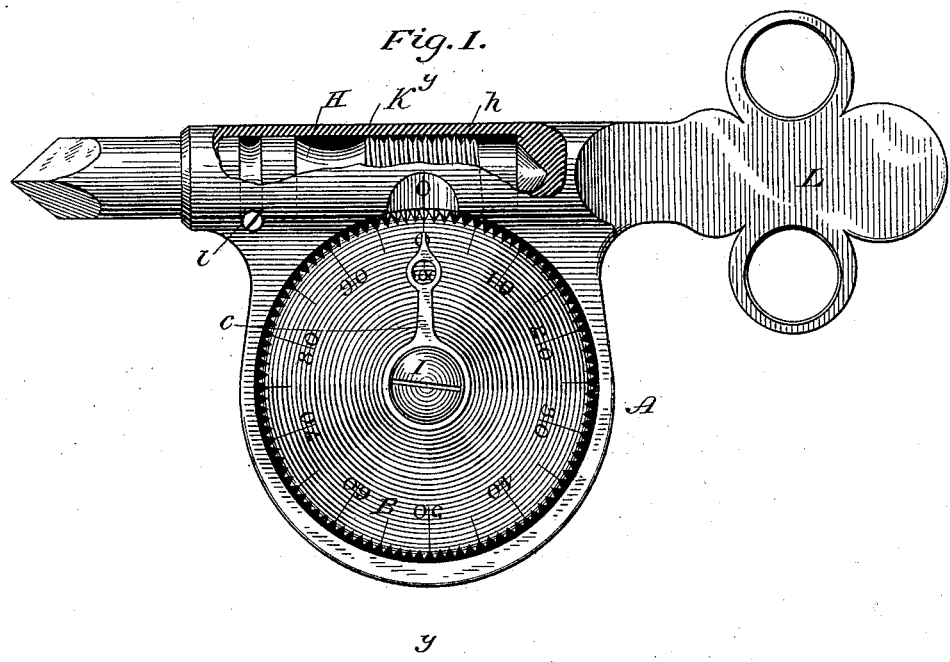
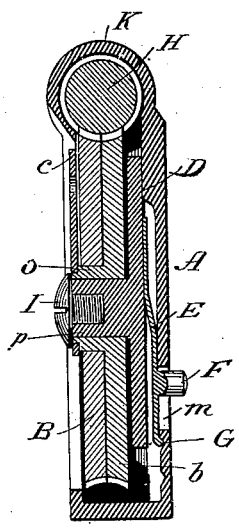
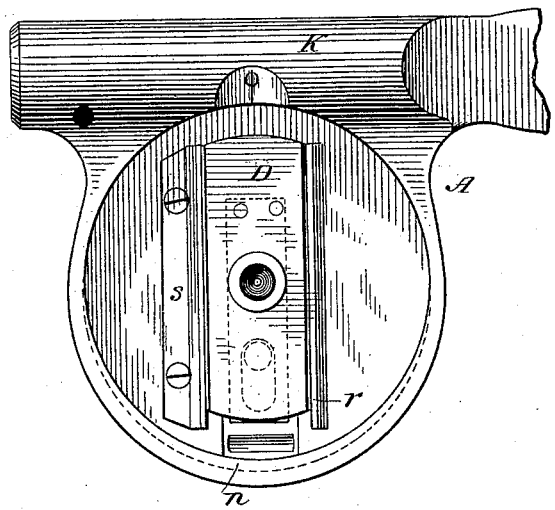
Attest:
R. F. Barnes
S. W. Luby
Inventor:
LOUIS J. WOHNLICH,
By Ellis Spear
ATTORNEY.

UNITED STATES PATENT OFFICE.

LOUIS J. WOHNLICH, OF DETROIT, MICHIGAN.

SPEED-INDICATOR FOR SHAFTING.

SPECIFICATION forming part of Letters Patent No. 252,285, dated January 10, 1882.

Application filed June 9, 1881. (No model.)

*To all whom it may concern:*

Be it known that I, LOUIS J. WOHNLICH, of Detroit, in the county of Wayne and State of Michigan, have invented a new and useful Improvement in Speed-Indicators; and I do hereby declare that the following is a full, clear, and exact description of the same.

My invention is a speed-indicator of a class specially adapted to record the speed of shafting. It is an improvement upon the form of indicators such as that shown in the patent of Detrick, granted August 4, 1868, No. 80,612; and the invention consists in certain improvements in details of construction whereby the registering-wheels are more readily thrown into and out of gear with the shaft and worm through which motion is communicated to the indicating mechanism.

In the drawings, Figure 1 is a front elevation of the apparatus; Fig. 2, a central longitudinal section on line $y\ y$ of Fig. 1. Fig. 3 is a front elevation with the wheels removed.

The general construction of this device includes two gear-wheels having a different number of teeth on their periphery, but both meshing into one worm, by which they are turned, whereby a differential movement is produced and the number of revolutions of the wheels indicated in the manner well known, which therefore need not be here described.

In Fig. 2 of the drawings the rear wheel is shown at $b$ and the front at B, and both alike mesh into the worm $h$ on the shaft H, Figs. 1 and 2. The wheel B is made with one hundred teeth and $b$ with one hundred and one. The wheel $b$ is provided with a hub, $o$, of a length slightly greater than the thickness of the wheel B. The wheel $b$ is slipped over a pintle, $p$, fixed to a plate, D, around which pintle it revolves, and the wheel B, when in place, is pivoted on the hub $o$ of the wheel $b$. The wheels are retained in place by a screw, I, in the end of the pintle $p$.

The plate D is made with beveled edges, as shown in Fig. 3, and fits under corresponding beveled edges of a rib, $r$, and plate $s$ in the bottom of the circular case A. This rib and plate fit snugly against the edge of the plate D and hold it closely in place, but allow it to slip back and forth toward or from the worm $h$.

Upon the under side of the plate D is fixed a spring, E, which, when the plate D is in place within this rib and plate, fits into a recess, G, in the bottom of the case, and is compressed therein so as to bear with some force on the bottom of the recess. A stud, F, upon the free end of the spring, projects through a slot, $m$, in the bottom of the case, by means of which the plate D, carrying the wheels B $b$, may be pushed toward the worm or from it, and thereby thrown into or out of gear, the spring E serving at the same time to hold it securely in place in either position. For convenience of inserting or removing these wheels from the case I make the plate $s$ removable, as shown in Fig. 3, the plate being held in place by a screw, by the removal of which the plate $s$ may be taken out and the plate D, with the wheels, removed. The wheels may be removed separately by simply unscrewing the screw I. This construction makes it more convenient for separating the parts for repairs or cleaning.

The case or frame A should be turned out to fit the wheels nicely, and in order to allow shifting away from the worm it may be reamed out, as shown at $n$ in dotted lines in Fig. 3.

The shaft H fits into a sleeve, K, formed upon one side of the case, and is held therein by a screw, $l$, working in a circumferential groove, $t$, in the shaft. A handle, L, is formed upon the end of the sleeve K, by means of which the instrument is held when in use.

An index-finger, $c$, is held firmly by the screw I upon the outer end of the pintle of the wheel $b$, and revolves therewith.

It will be readily understood that when the wheels are thrown out of gear by sliding them, together with the plate D, toward the bottom of the case, as shown in the figures, the wheels B $b$ may be turned independently, in order to set the index-finger and zero-point upon the wheel B at any desired point, both the index and the zero-point upon the wheel B being set opposite the point 1 upon the sleeve K. When the shaft H is revolved the wheel having the smaller number of cogs will gain upon the other a space equal to one tooth in one revolution, which will be indicated by the index-finger upon the graduated face of the wheel B, thus indicating in the well-known way the number of revolutions of the shaft H, the point of which is held against the revolving object by means of the handle L.

Having thus described my invention, what I claim is—

The combination of the plate D, having a spring, E, and pintle $p$, with the wheel $b$, having hub $o$, wheel B, index-finger $c$, and worm-shaft H, substantially as described.

In testimony whereof I have signed my name to this specification in the presence of two subscribing witnesses.

LOUIS J. WOHNLICH.

Witnesses:
WILLIAM SCHMIDT,
WM. FITZ GERALD.